United States Patent [19]

Bennetch et al.

[11] 4,176,172

[45] Nov. 27, 1979

[54] PARTICLE GAMMA FERRIC OXIDE

[75] Inventors: Leonard M. Bennetch; Harry S. Greiner, both of Bethlehem; Kenneth R. Hancock, Easton, all of Pa.; Mark Hoffman, Phillipsburgh, N.J.

[73] Assignee: Pfizer Inc., New York, N.Y.

[21] Appl. No.: 855,430

[22] Filed: Nov. 28, 1977

Related U.S. Application Data

[60] Continuation of Ser. No. 643,346, Dec. 22, 1975, abandoned, which is a division of Ser. No. 370,635, Jun. 18, 1973, abandoned, which is a division of Ser. No. 225,636, Feb. 11, 1972, abandoned, which is a continuation-in-part of Ser. No. 125,331, Mar. 17, 1971, abandoned.

[51] Int. Cl.$^2$ ............................................. C01G 49/06
[52] U.S. Cl. .................................... 423/634; 252/62.56
[58] Field of Search ....................... 252/62.56; 423/634

[56] References Cited

U.S. PATENT DOCUMENTS

| | | | |
|---|---|---|---|
| 2,935,379 | 5/1960 | Martin | 423/633 |
| 3,015,627 | 1/1962 | Ayers et al. | 423/634 X |
| 3,382,174 | 5/1968 | Hund | 423/634 X |

FOREIGN PATENT DOCUMENTS 51835 9/1966 Poland ....................................... 423/634

*Primary Examiner*—Jack Cooper
*Attorney, Agent, or Firm*—Connolly and Hutz

[57] ABSTRACT

Synthetic lepidocrocite (gamma ferric oxide monohydrate) having very fine-grained, needle-like crystalline particles, with at least about 70% of the particles having a length to width ratio of greater than 10:1, and a length of up to about 2 microns is made by first oxidizing a vigorously agitated alkaline-treated ferrous chloride solution until the pH is about 2.9-4.1 to form a synthetic lepidocrocite collodial seed slurry. The oxidation of the colloidal seed slurry is continued (optionally in the presence of metallic iron) at a temperature about 80°-140° F. and pH about 2.9-4.1 in the presence of excess ferrous chloride, until from about 1.2 to 5 parts by weight of total product is formed per part by weight of seed. A synthetic magnetic gamma ferric oxide may be made from the synthetic lepidocrocite by optionally coating the lepidocrocite particles with an organic surfactant, reducing, oxidizing and mechanically densifying the gamma ferric oxide particles. Magnetic impulse record members comprising a binding medium having therein the synthetic magnetic gamma ferric oxide are also disclosed.

1 Claim, No Drawings

PARTICLE GAMMA FERRIC OXIDE

CROSS REFERENCE TO RELATED APPLICATIONS

This application is a continuation of application Ser. No. 643,346 filed Dec. 22, 1975 now abandoned which is a division of application Ser. No. 370,635 filed June 18, 1973 now abandoned which is a division of application Ser. No. 225,636 filed Feb. 11, 1972 now abandoned which is a continuation-in-part of application Ser. No. 125,331 filed March 17, 1971 now abandoned.

BACKGROUND OF THE INVENTION

Processes have been described for the preparation of magnetic gamma ferric oxide useful in the making of magnetic tapes and recording members. Ayers et al., U.S. Pat. No. 3,015,627 discloses preparing magnetic iron oxides from a synthetic magnetic gamma ferric oxide monohydrate by reduction and oxidation, resulting in plate-like crystalline particles similar to the ferric oxide monohydrate particles, having preferably a length to width ratio up to about 10:1, a width to thickness ratio at least 3:1, and a length up to about 5 microns.

Although the recording members containing these magnetic iron oxides have performed satisfactorily in many respects, the members are lacking in several qualities which contribute to their unsatisfactory or limited performance in several fields.

SUMMARY OF THE INVENTION

The present invention discloses a process for making synthetic lepidocrocite (gamma ferric oxide monohydrate) characterized by having very fine-grained, needle-like crystalline particles, with at least about 70% of the particles having a length to width ratio of greater than 10:1, and a length up to about 2 microns. This is accomplished by first making synthetic lepidocrocite colloidal seed slurry which comprises:

(a) combining ferrous chloride with aqueous alkali, said ferrous chloride concentration being about 0.25–0.50 pounds per gallon; and (b) vigorously agitating the mixture of (a) while introducing an oxygen-containing gas until the mixture pH is about 2.9–4.1. Preferably said aqueous alkali is selected from the group consisting of NaOH, NH$_4$OH, and Ca(OH)$_2$. The slurry is than maintained under a condition of vigorous agitation at a temperature about 80°–140° F. and a pH about 2.9–4.1 in the presence of excess ferrous chloride, while simultaneously and continuously introducing alkali and an oxygen-containing gas until about 1.2–5 parts by weight of total product is formed per part by weight of said seed. Alternatively, the slurry is maintained under a condition of vigorous agitation at a temperature about 80°–140° F. and a pH about 2.9–4.1 in the presence of excess ferrous chloride and metallic iron, while continuously introducing an oxygen-containing gas until about 1.2–5 parts by weight of total product is formed per part by weight of said seed.

A synthetic magnetic gamma ferric oxide can be produced from the synthetic lepidocrocite by reducing and oxidizing the lepidocrocite, and mechanically densifying the gamma ferric oxide product. Optionally, before reducing and oxidizing, the lepidocrocite particles are coated with at least one hydrophobic aliphatic monocarboxylic acid having 8–24 carbon atoms.

A magnetic impulse record member comprising a binding medium having therein the synthetic magnetic gamma ferric oxide can be made, said member characterized by having a Br/Bm ratio of at least 0.84 in a 1000 oersted field, and an orientation ratio of at least 2.4 in a 1000 oersted field.

DETAILED DESCRIPTION OF THE INVENTION

The invention relates to improvements which are observed in the performance of magnetic impulse record members especially in the form of tapes, but including bands, discs, sheets, cylinders, moving picture films, electronic computer components, and telemetering equipment. The unique characteristics of the synthetic lepidocrocite made by the methods described herein, and the improved process embodiments for making magnetic gamma ferric oxide result in obtaining superior performance characteristics in the record members containing the ferric oxide.

Synthetic lepidocrocite characterized by having very fine-grained, needle-like crystalline particles, with at least about 70% of the particles having a length to width ratio of greater than 10:1, and a length up to about 2 microns is prepared herein by first forming a collodial seed slurry of the lepidocrocite. It should be remarked that lepidocrocite having a length to width ratio of from 20:1 to 50:1 may even be prepared by the new process. Ferrous chloride is combined with an aqueous alkali to form precipitated ferrous hydroxide, which is then oxidized under conditions of vigorous agitation to form precipitated colloidal seed lepidocrocite. The oxidation is accomplished by introducing an oxygen-containing gas into the mixture until the pH is about 2.9–4.1 (usually after about ½–2 hours). Although ferrous chloride is used, this is not meant to exclude the use of other iron salts (e.g. ferrous sulfate, nitrate, etc.) Preferably, the aqueous alkali used is NaOH, NH$_4$OH, or Ca/OH)$_2$. The ferrous chloride concentration should be about 0.25–0.50 pounds per gallon before precipitation of ferrous hydroxide. The ferrous chloride can be added to the aqueous alkali or vice versa. Typically between about 0.2 and 1 pounds of NaOH per gallon can be used or equivalent amounts for other alkalies. Ammonia gas may be used in place of NH$_4$OH, by vigorously contacting the aqueous ferrous chloride solution with an ammonia-oxygen-containing gas mixture. Also, other alkali are not excluded from use herein (e.g. KOH, Ba(OH)$_2$, Mg(OH)$_2$, pyridine, aniline, and many others). Any oxygen-containing gas can be used to provide a bubbling action which aids in the vigorous agitation of the mixture; preferably air or oxygen is used. Of course, when the mixture pH reaches about 2.9–4.1, and preferably about 3–3.5, this is an indication that sufficient seed has been formed to now begin the lepidocrocite product generation step to produce about 1.2–5 parts, and preferably about 2 parts by weight, of total product per part of seed. The product to seed ratio is a critical parameter to be controlled. The desired fine particles having large length to width ratios are obtained by using the low growth ratios herein disclosed. Prior art methods have generally employed product to seed ratios of greater than about 6:1, resulting in lower particle length to width ratios.

At the end of the seed forming step the temperature has generally risen above 80° F. and with an initial concentration of 0.25–0.50 pounds of ferrous chloride per gallon there is usually sufficient excess ferrous chloride present which is needed during the generation step to allow the desired synthetic lepidocrocite product to form which usually takes about 5–50 hours. Close control of pH and temperature conditions are necessary to obtain the desired product. For example at pH much below about 2.9 precipitation of ferric product is incomplete; at pH much above 4.1 the desired crystal morphology is altered. Similarly, temperature outside the preferred temperature range of 80°–140° F. results in an undesirable product. Alternatively, metallic iron can be added during the generation step, obviating the necessity for addition of alkali - the iron providing the necessary basic reaction conditions. Generating the product without using metallic iron can usually be accomplished at 80°–120° F., while generation using metallic iron requires temperatures somewhat higher. It is to be noted that air rates and reaction times are not critical, depending primarily on reactor design. However, vigorous agitation is deemed necessary during the formation of the lepidocrocite seed slurry and product to result in the desirable lepidocrocite particle characteristics. The vigorous agitation ensures sufficient contact of the oxygen-containing gas to promote the desired product precipitation and morphology. This can be conveniently accomplished by mechanical stirring and the action of bubbling the oxygen-containing gas through the mixture; however, this does not exclude other means of accomplishing the same result familiar to anyone skilled in the art.

Synthetic magnetic gamma ferric oxide exhibiting improved magnetic properties on record members can be produced from the synthetic lepidocrocite previously described. Length to width ratios of about 9:1 to 20:1 can be obtained in the magnetic ferric oxide particles which are characterized similarly to the lepidocrocite particles as very fine-grained, needle-like crystalline particles, having a length up to about 2 microns. In fact, the synthetic magnetic gamma ferric oxide, produced by the new process exhibits higher particle length to width ratios than it has been found possible to attain by previously disclosed processes. The improved magnetic properties obtained are directly attributable to the greatly improved characteristics of the lepidocrocite. The synthetic magnetic gamma ferric oxide can be produced from the synthetic lepidocrocite by reducing the latter with hydrogen to ferroso-ferric oxide at high temperature conditions (typically 600°–800° F.), then oxidizing with air (typically at about 450°–720° F.), and then mechanically densifying the product (typically in a muller-mixer machine, ball or roller mill, etc.) to improve its frequency response characteristics, especially its high frequency response characteristics when incorporated in recording members. The densification step is provided to decrease the degree of agglomeration of particles which may result during processing, while maintaining the same particle size (i.e. there is substantially no particle degradation during densification). A more preferred method of making the magnetic ferric oxide from lepidocrocite is to apply a coating of an organic surface treating agent to the lepidocrocite particles before reducing and oxidizing. The coating is preferably a monomolecular layer on the particles, consisting of at least one hydrophobic aliphatic monocarboxylic acid, having 8–24 carbon atoms. This coating tends to keep the particles from agglomerating during processing by neutralizing surface-active forces and results in superior magnetic orientation characteristics in the final product. Also the use of such a fatty acid coating obviates the need for hydrogen during processing, due to the inherent reducing action of the surface treating agent. The coating can be accomplished in many ways with many different monocarboxylic acids as disclosed in Greiner, U.S. Pat. No. 3,498,748. Preferably, about 1.6–10% of coconut oil fatty acid or lauric acid is used (alone or as a mixture), rendered water-soluble or dispersible by addition of about 0.15–1.5% morpholine, percentages based on the weight of lepidocrocite in the mixture.

The use of the synthetic magnetic gamma ferric oxide described above in magnetic impulse record members results in superior performance characteristics in these members, especially in tapes.

A magnetic tape containing the gamma ferric oxide thus obtained can be produced by the following procedure.

The ingredients set out in the table below, in parts by weight, are mixed and introduced into a ball mill.

| | |
|---|---|
| Gamma ferric oxide. $Fe_2O_3$ | 840 |
| Methyl abietate-maleic glycol ester | 60 |
| Vinyl resin (13% vinyl acetate - 87% vinyl chloride copolymer) | 120 |
| A plasticizer (a linear high molecular weight polyester resin prepared by the reaction of a dibasic acid with a dihydric aliphatic alcohol | 60 |
| Methyl isobutyl ketone | 500 |
| Toluol | 300 |
| Sodium dioctylsulfosuccinate | 33.5 |

This mixture is milled for twenty hours or longer yielding a product of at least Hegman Fineness 6.5 and a viscosity of approximately 83 Krebs Units. The mass is then mixed with an additional 200 parts of toluol and applied in accordance with known practice to a cellulose acetate base in the form of an 8–12 inch wide strip. While the applied coating is still wet, it is run through a magnetic field to orient the particles in known manner after which the strip is dried, calendered, compressed and burnished and finally it is slit and put on rolls or reels under tension, the normal coating thicknesses being from about 0.20 to 0.60 mil, and in this specific instance, being about 0.45 mil.

Magnetic tapes made with the magnetic gamma ferric oxide described previously exhibit orientation ratios of at least 2.4, and square magnetic hysteresis loops having a Br/Bm value of at least 0.84 in a 1000 oersted field. Also, the magnetic tapes exhibit very good high frequency response characteristics. Of course these values should not be deemed limiting but representative of some of the improvements over the characteristics of tapes containing magnetic gamma ferric oxide disclosed in the prior art. These known tapes exhibit typically in a 1000 oersted field, orientation ratios up to 2.2 and Br/Bm values of about 0.83, although claims to higher ratios have been made. Of course, the magnetic characteristics of the tape that are imparted to it by the iron oxide incorporated therein can be ultimately altered by changing the oxide particle size characteristics by varying process conditions (e.g. lepidocrocite total product to seed ratio, degree of mechanical densification of gamma ferric oxide, etc.). Thus for example, smaller length particles give lower Br/Bm values. By carefully controlling the process conditions for making the lepidocrocite, magnetic gamma ferric oxide, and the tape, even more enhanced magnetic performance characteristics can be obtained from the tape—Br/Bm values of about 0.91 and orientation ratios of about 5, and higher can be expected.

The following examples are provided by way of illustration and should not be interpreted as limiting this invention, the scope of which is defined by the appended claims.

EXAMPLE I

A. Preparation of Synthetic Lepidocrocite

In a 250 gallon tank equipped with a mechanical stirrer and a perforated pipe air sparger was added 132 gallons of 80° F. tap water and 21.25 gallons of aqueous solution containing 63.8 pounds ferrous chloride. Dilute the mix to 155 gallons. While vigorously stirring, over a 15 minute period, pump in 34 gallons of aqueous ammonia containing 3.7 gallons of ammonium hydroxide (assaying at 28.8% ammonia). Continue the stirring, turn on air, and completely oxidize to pH 3.3 in 1 hour, to form a synthetic lepidocrocite seed slurry. Complete lepidocrocite precipitation by heating above slurry to 100° F., pumping in additional ammonia solution (52 gallons containing 4.25 gallons of the above 28.8% ammonium hydroxide) at the rate of 0.11 gallons per minute, or alternatively by injecting 0.4–0.5 cfm $NH_3$ gas, while continuing aeration and stirring. After 7½ hours, precipitation was ended, 49.6 gallons ammonia solution or 9.5 lbs. $NH_3$ gas was used, batch volume was 242 gallons and contained 44.3 pounds of hydrated gamma ferric oxide, lepidocrocite. Final pH value was 3.7. This represents a lepidocrocite total product to seed ratio of about 2:1 based on the total amount of 28.8% ammonia solution used (7.76 gal.) divide by amount of 28.8% ammonia solution used before heating slurry to 100° F. (3.7 gal.).

Examination of the product by X-ray diffraction shows a composition of over 99% hydrated gamma ferric oxide known as lepidocrocite, shown by electron microscopy measurements to have acicular type crystals occurring in bundles, the crystals averaging up to about 2 microns in length and having a length to width ratio of about 20:1 to 50:1 (e.g. particles measured at 1 micron length and 0.02 microns width). Comparison of the X-ray diffraction of the experimental product prepared above with the standard lepidocrocite X-ray diffraction pattern reported as ASTM-8-98 in the ASTM diffraction card file is as follows:

| Experimental | | ASTM 8-98 (Lepidocrocite) | |
|---|---|---|---|
| "d"A° | I/Io | "d"A° | I/Io |
| 6.28 | 100 | 6.26 | 100 |
| 3.30 | 92 | 3.29 | 90 |
| 2.48 | 75 | 2.47 | 80 |
| 2.36 | 15 | 2.36 | 20 |
| 2.10 | 20 | 2.09 | 20 |
| 1.94 | 65 | 1.937 | 70 |

Similar results are obtained using pure oxygen gas instead of air, and using NaOH or $Ca(OH)_2$ instead of $NH_4OH$ or $NH_3$ gas.

B. Preparation of Synthetic Magnetic Gamma Ferric Oxide

Surface treatment was done by heating the lepidocrocite product tank slurry to 175° F., then while stirring add a surface treating agent mix of 1.1 pounds of coconut oil fatty acid and 0.2 pounds of morpholine in 4 gallons of hot water. Continue heating to 190° F., filter, wash filter cake salt free. Product is practically pure lepidocrocite coated with about 2½% by weight of the fatty acid surface treating agent.

This material was reduced in either a batch type or continuous processing furnace at 750° F. in a hydrogen atmosphere to ferroso ferric oxide and subsequently oxidized in a current of air at 475° F. to gamma ferric oxide whose magnetic properties were improved by mechanically densifying, a half hour, in a muller-mixer machine. The resulting finished oxide tested magnetically in a 1000 oersted field as a dry powder showed Hc of 365, Br of 2040, Bm of 3470. As a dispersion in oil, showed Hc 362, Br 3365, Bm 3760. By electron microscopy measurements the dry ferric oxide particles had an average length to width ratio of 9.3 to 1 and an average length up to about 2 microns.

A similar ferric oxide product is obtained when the surfactant treatment step is eliminated.

EXAMPLE II

In Example I, Part A, metallic iron can be substituted as precipitant in the lepidocrocite product generation step. An example of this method follows. Made two identical preparations of about 200 gallons each of synthetic lepidocrocite seed slurry from ferrous chloride and ammonia by the method described in Example I. Combined them and transferred them to a 500 gallon tank having an inner reservoir containing metallic iron and an aerator under the iron and near the tank bottom. The combined slurries were heated to 140° F. and held there while oxidizing with air causing dissolution of iron and precipitation of hydrated ferric oxide. This aeration continued 36 hours when lepidocrocite in batch totaled 75 pounds. The synthetic lepidocrocite product is similar to that of Example I, Part A.

As in the procedure of Example I, Part B, the resulting slurry and contained oxide were surfactant treated, filtered, washed, dried, etc. in the manner of Example I, Part B, to final gamma oxide product. This also exhibited good magnetics. Dry powder test being Hc 340, Br 1987, Bm 3500; with oil dispersion, Hc 363, Br 3365, Bm 3760 at 1000 oersted field strength.

EXAMPLE III

The magnetic gamma ferric oxide is prepared as in Example I except that in the reduction of lepidocrocite to ferroso-ferric oxide no gaseous reductant such as hydrogen is used. The entire reduction is effected by the organic surfactant coating on the lepidocrocite particles under the same furnace temperature. This product is also good magnetically having a dry powder Hc of 303, Br 1892, Bm 3388 and an oil dispersion in Hc 325, Br 2841, Bm 3207.

EXAMPLE IV

In a 500 gallon tank equipped with stirrer and air sparger was added 260 gallons of 80° F. water and 40 gallons of aqueous solution containing 130 pounds of ferrous chloride. While stirring, over a 10–15 min. period, pump in 80 gallons of solution containing 20 pounds NaOH. While still stirring, oxidize with 5 cfm air, until ferrous precipitate is oxidized to ferric form. This requires about an hour. Complete oxide precipitation by heating above slurry to 125° F., continuing agitation and aeration while continuously injecting additional caustic soda solution until total product amounts of 90 pounds of oxide, while regulating alkali addition to maintain pH value in 3.0-3.7 range. Resulting synthetic lepidocrocite is converted to magnetic gamma oxide as described in Example I with similar results.

EXAMPLE V

In a 250 gallon tank with stirrer and aerator, to 130 gallons of water at 80° F., add 20 gallons of aqueous solution containing 64 pounds ferrous chloride. While stirring over a 10-15 min. period pump in 40 gallons of a lime slurry containing 18.5 pounds Ca(OH)$_2$. Continue stirring, commence oxidation, and continue approximately 1 hour until ferrous precipitate is completely converted to ferric form and pH becomes about 3.5. Complete synthetic lepidocrocite precipitation by gradual addition of 40 gallons more lime slurry over about 8 hours under conditions of agitation, aeration, temperature of 135° F., and maintaining pH in 3.0-3.7 range by regulating rate of lime addition. Final product of about 45 pounds is processed to magnetic gamma ferric oxide as described in Example I with similar results.

EXAMPLE VI

A. Preparation of Synthetic Lepidocrocite

In a 1200 gallon tank equipped with a mechanical stirrer and a perforated pipe air sparger was added 572 gallons of 40° F. tap water and 79 gallons of aqueous solution containing 298 pounds ferrous chloride. While vigorously stirring, over a 15 minute period, pump in 156 gallons of aqueous ammonia containing 16.6 gallons of ammonium hydroxide (assaying at 28.8% ammonia). Continue the stirring, turn on air, and completely oxidize to pH 3.8 in 1 hour, 15 minutes to form a synthetic lepidocrocite seed slurry. Complete lepidocrocite precipitation by heating above slurry to 100° F., pumping in additional ammonia solution (233 gallons containing 19.2 gallons of the above 28.8% ammonium hydroxide) at the rate of 0.52 gallons per minute, or alternatively by injecting 1.9-2.4 cfm NH$_3$ gas, while continuing aeration and stirring. After 7 hours, 55 minutes, precipitation was ended, 233 gallons ammonia solution or 44.7 lbs. NH$_3$ gas was used, batch volume was 1037 gallons and contained 224 pounds of hydrated gamma ferric oxide, lepidocrocite. Final pH value was 4.1. This represents a lepidocrocite total product to seed ratio of about 2:1 based on the total amount of 28.8% ammonia solution used (35.8 gal.) divided by amount of 28.8% ammonia solution used before heating slurry to 100° F. (16.6 gal.).

B. Preparation of Synthetic Magnetic Gamma Ferric Oxide

Surface treatment was done by heating the lepidocrocite product tank slurry to 175° F., then while stirring add a surface treating agent mix of 5.7 pounds of coconut oil fatty acid (COFA) and 0.5 pounds of morpholine in 15 gallons of hot water. Continue heating to 190° F., filter, wash filter cake salt free. Product is practically pure lepidocrocite coated with about 3% by weight of the fatty acid surface treating agent.

This material was reduced in either a batch type or continuous processing furnace at 800° F. in a COFA reducing atmosphere to ferroso ferric oxide and subsequently oxidized in a current of air at 720° F. to gamma ferric oxide whose magnetic properties were improved by mechanically densifying, one hour, 15 minutes, in a muller-mixer machine. The resulting finished oxide tested magnetically in a 1000 oersted field as a dry powder showed Hc of 335, Br of 1770, Bm of 3650. In a tape, showed Hc 310. By electron microscopy measurements the dry ferric oxide particles had an average length to width ratio of 9.3 to 1 and an average length up to about 2 microns.

A similar ferric oxide product is obtained when the surfactant treatment step is eliminated.

EXAMPLE VII

Using a magnetic tape testing machine and all necessary auxiliary equipment for evaluating tapes, the synthetic gamma ferric oxide of the invention was incorporated in a magnetic tape according to standard procedures previously described and compared with tapes smilarly made having magnetic gamma ferric oxides prepared according to prior art methods. To provide a standard of comparison so that the tested tapes are intercomparable, the tape transport is adjusted to give a frequency response of 0 db output at all frequencies encompassing the audio range (about 100 to 15,000 Hertz or cycles/second), using a generally good audio tape readily available commercially (for example Minnesota Mining and Manufacturing Co. 111-A or others).

The following tapes were compared:

Tape No. 1: contains a magnetic gamma ferric oxide made by standard methods of reduction and oxidation of a precipitated hydrated alpha ferric oxide, starting from ferrous sulfate (the process for making the hydrated alpha ferric oxide is similar to that described in Penniman and Zoph, U.S. Pat. Nos. 1,327,061 and 1,368,748). There was no mechanical densification of the ferric oxide, (manufactured by Pfizer Inc., for low A.C. Noise tape, and designated MO-2035).

Tape No. 2: The magnetic gamma ferric oxide contained herein is prepared similarly to that for Tape No. 1, except that the resulting gamma ferric oxide is treated with a surfactant, trioxyaluminum-tridodecylbenzenesulfonate, according to the method disclosed in U.S. Pat. No. 3,294,686 and mechanically densified to about 0.85 g/cc prior to incorporation in the tape to obtain better frequency response. The oxide is manufactured by Pfizer Inc., and is designated MO-2530.

Tape No. 3: The magnetic gamma ferric oxide contained herein is prepared from precipitated hydrated gamma ferric oxide by a method similar to that disclosed in U.S. Pat. No. 3,015,627. The oxide has been manufactured by Pfizer Inc., and is designated IRN-220.

Tape No. 4: The magnetic gamma ferric oxide contained herein is the same as that described for Tape No. 3, except that the oxide is mechanically densified to about 0.85 g/cc prior to incorporation in the tape to obtain better frequency response.

Tape No. 5: The magnetic gamma ferric oxide contained herein is that prepared in Example VI.

Table 1 below gives a comparison of the magnetic performance of the five tapes described above. The tapes were tested on an Ampex 300 tape recorder-reproduce machine at a tape speed of 7½ inches/second.

TABLE 1

| Tape No. | 1 | 2 | 3 | 4 | 5 |
|---|---|---|---|---|---|
| Milling Time | | | | | |

TABLE 1-continued

| Tape No. | 1 | 2 | 3 | 4 | 5 | |
|---|---|---|---|---|---|---|
| (hours) | 48 | 48 | 48 | 48 | 48 | |
| Milling Viscosity (KU) | 79 | 79 | 74 | 75 | 86 | |
| Coating Thickness (Micro Inches) | 495 | 475 | 450 | 425 | 426 | |
| Peak Bias (mA) | 6.48 | 5.68 | 5.6 | 5.4 | 5.6 | |
| Freq. Response at 100 Hz (dB) | −1.0 | 0.8 | 1.5 | 2.0 | 2.1 | |
| at 1 kHz (dB) | −0.5 | 1.3 | 1.8 | 2.4 | 2.6 | |
| at 7.5 kHz (dB) | 0.1 | 1.6 | 1.9 | 2.7 | 5.0 | |
| at 10 kHz (dB) | 0.3 | 1.6 | 2.0 | 2.9 | 5.8 | |
| at 15 kHz (dB) | 1.2 | 2.6 | 3.0 | 3.8 | 8.0 | |
| Output at 3% THD (dB) | 9.8 | 10.9 | 11.6 | 12.0 | 13.0 | |
| A. C. Noise (1–5 kHz) (dB) | −69.4 | −69.1 | −68.8 | −68.5 | −69.1 | |
| D. C. Noise (1–5 kHz) (dB) | −61.8 | −62.2 | −61.8 | −59.5 | −60.5 | |
| Saturated Output (dB) 500 Hz | 16.2 | 17.4 | 18.2 | 18.6 | 19.3 | |
| Saturated Output (dB) 15 kHz | −5.0 | −4.5 | −4.7 | −4.3 | 0.2 | |
| Dynamic Range (dB) | 68.9 | 70.4 | 70.6 | 70.9 | 71.7 | |
| Signal/Noise (dB) | 79.2 | 80.0 | 80.4 | 80.5 | 82.1 | |
| Print Thru (dB) | 50.4 | 47.9 | 43.5 | 43.5 | 47.0 | |
| Tape Hc (1 kOe) | 319 | 292 | 288 | 283 | 310 | |
| Tape Br (GAUSS) | 950 | 1125 | 1287 | 1418 | 1467 | |
| Tape Bm (GAUSS) | 1245 | 1420 | 1577 | 1708 | 1683 | |
| Br/Bm at 1 kOe | 0.762 | 0.791 | 0.816 | 0.830 | 0.87 | |
| Orientation Ratio | 1.58 | 1.78 | 2.11 | 2.20 | 2.90 | at 1000 oe. |
|  | 2.62 | 2.97 | 3.92 | 4.08 | 6.35 | at field to maximize |
| Resistance ($10^9$ OHMS) | 100 | 175 | 30 | 12 | 1.3 | |

With respect to the results shown in the above table the milling time (hours) and milling viscosity (Krebs Units) refer to the conditions during the preparation of each tape according to the procedure previously described. Coating thickness refers to the thickness of coated magnetic mixture on the finished tape.

The frequency response of Tape No. 5 is quite superior to the other Tapes, especially at the higher frequencies. Audio output is in decibels (db). They are plus units if over zero db and minus units if less than zero db. They are really a ratio and are defined as 20 times the logarithm to the base 10 of a ratio of two numbers. Thus any units which are existing in a ratio of 2 to 1 (2/1), for example, by definition is 20×log of 2=20×0.301=6.02 db greater or +6 db is equal to twice the observed quantity whatever it may be. Similarly +3 db=1.41×the observed quantities.

Peak bias refers to milliamperes of current in the magnetic heads necessary to produce the maximum output signal at one specified frequency. Bias refers to a high frequency signal imposed on the heads usually around 80,000 Hertz for the purpose of securing an undistorted and linear output signal from the magnetic tape.

Output at 3% THD (Total Harmonic Distortion) is important because the highest outputs at this point are desirable. The 3% THD point is more or less arbitrary in that an audio signal more than 3% THD is obnoxious to the ear. This output is measured electronically by comparing a pure sine wave signal to the output signal and increasing the output until 3% THD is reached.

A.C. Noise refers specifically to the noise level of the alternating current erased tape with the bias only on the record heads. Various preparations of magnetic oxide using the invention methods and products disclosed herein have had very low A.C. Noise down to −71 db and as high as −67.7 db (the more negative numbers mean lower noise).

D.C. Noise is determined on a tape that has been erased by a permanent magnet, simulating erasure as accomplished on some of the less expensive magnetic recorders. The value obtained is related to the excellence of the dispersion of the magnetic oxide in the film and to surface smoothness. The better dispersion and the better smoothness gives the lower noise.

Saturated output at 500 Hertz is the maximum signal obtained from the tape as the input signal is increased. This output is directly related to the magnetic properties of the gamma iron oxide used, the thickness of the tape coating, and the density of the magnetic tape coating.

Saturated output at 15,000 Hertz is related to the resistance of the magnetic particles in the tape to the self-demagnetization field produced by the 15,000 Hertz recorded signal.

Print-thru in db relates to the echo signal obtained by close proximity of an unrecorded tape to a recorded tape. The higher number is the better. Print-thru signals occur most commonly in recorded tape in the reels conditioned with the passing of time.

Dynamic range is the total difference in db between output at 1000 Hertz and A.C. Noise. Signal/noise is the total difference in db between the output at 3% distortion and A.C. Noise. The higher numbers are most desirable.

Tape Hc, Br, and Bm are standard magnetic properties and they vary according to the magnetic properties of the magnetic particles used and also vary according to the tape making system. These tapes were made on the same system.

Br/Bm measures the squareness of the magnetic hysteresis loop. The highest figure is most desirable and Tape No. 5 containing the unique magnetic gamma ferric oxide of the invention is outstandingly different in this respect. The measurement is made in a field of 1000 oersteds in a 60 cycle BH meter.

Orientation ratio measures ratio of the Br (remaining magnetism on the tape after the magnetic field is removed) in the direction parallel to tape travel to the Br perpendicular to tape travel. It is measured at 1000 oersteds and at a lower field (usually about 300 oersteds) whichever field maximizes the ratio. Here Tape No. 5 is outstanding and unique. The 2.90 value at 1000 oersteds is the highest ever observed for any magnetic gamma iron oxide tape. Resistance of tape is electrical surface resistivity. The lowest figure is most desirable.

EXAMPLE VIII

A. Preparation of Synthetic Lepidocrocite

In a 1200 gallon tank equipped with stirrer and air sparger was added 572 gallons of 80° F. water and 82 gallons of aqueous solution containing 325 pounds of ferrous chloride solution. While stirring, over a 10–15 minute period, pump in 190 gallons of solution containing 88 pounds NaOH. While still stirring, oxidize with 8.6 cfm air, until ferrous precipitate is oxidized to ferric form. This requires about an hour. Complete oxide precipitation by heating above slurry to 130° F., continuing agitation and aeration while continuously injecting additional caustic soda solution until total product amounts to 202 pounds of oxide, while regulating alkali addition to maintain pH value in 3.0–3.3 range. Resulting synthetic lepidocrocite is converted to magnetic gamma oxide.

B. Preparation of Synthetic Magnetic Gamma Ferric Oxide

Surface treatment was done by heating the lepidocrocite product tank slurry to 175° F., then while stirring add a surface treating agent mix of 1.1 pounds of coconut oil fatty acid and 0.2 pounds of morpholine in 4 gallons of hot water. Continue heating to 190° F., filter, wash filter cake salt free. Product is practically pure lepidocrocite coated with about 2½% by weight of the fatty acid surface treating agent.

This material was reduced in either a batch type or continuous processing furnace at 800° F. in the reducing atmosphere of the coconut oil fatty acid to ferroso ferric oxide and subsequently oxidized in a current of air at 700° F. to gamma ferric oxide whose magnetic properties were improved by mechanically densifying, 45 minutes, in a muller-mixer machine.

EXAMPLE IX

A. Preparation of Synthetic Lepidocrocite

In a 1200 gallon tank equipped with a mechanical stirrer and a perforated pipe air sparger was added 572 gallons of 68° F. tap water and 75.5 gallons of aqueous solution containing 325 pounds ferrous chloride. While vigorously stirring, over a 15 minute period, pump in 190 gallons of sodium hydroxide solution containing 88 pounds of sodium hydroxide. Continue the stirring, turn on air, and completely oxidize to pH 2.9 in 1 hour, 3 minutes to form a synthetic lepidocrocite seed slurry. Complete lepidocrocite precipitation by heating above slurry to 102° F., pumping in additional sodium hydroxide solution (210 gallons containing 110 pounds sodium hydroxide) at the rate of 0.55 gallons per minute, while maintaining the pH at 2.9–4.1, and continuing aeration and stirring. After 6 hours, 45 minutes, precipitation was ended, 210 gallons sodium hydroxide solution was used, batch volume was 1100 gallons and contained 234 pounds of hydrated gamma ferric oxide, lepidocrocite. Final pH value was 6.7 due to excess sodium hydroxide. This represents a lepidocrocite total product to seed ratio of about 2.2–1 based on the total amount of sodium hydroxide used (198 pounds) divided by amount of sodium hydroxide used before heating slurry to 102° F. (88 pounds).

B. Preparation of Synthetic Magnetic Gamma Ferric Oxide

Surface treatment was done by heating the lepidocrocite product tank slurry to 175° F., then while stirring add a surface treating agent mix of 5.7 pounds of coconut oil fatty acid and 0.5 pounds of morpholine in 15 gallons of hot water. Continue heating to 190° F., filter, wash filter cake salt free. Product is practically pure lepidocrocite coated with about 3% by weight of the fatty acid surface treating agent.

This material was reduced in either a batch type or continuous processing furnace at 800° F. in a COFA reducing atmosphere to ferroso ferric oxide and subsequently oxidized in a current of air at 700° F. to gamma ferric oxide whose magnetic properties were improved by mechanically densifying, 45 minutes, in a muller-mixer machine. The resulting finished oxide tested magnetically in a 1000 oersted field as a dry powder showed Hc of 332, Br of 2010, Bm of 3650. In a tape, showed Hc 311, Br 1411, Bm 1612.

EXAMPLE X

Following the procedure of Example VII, the following tapes containing magnetic gamma ferric oxides were compared:

Tape No. 6: The magnetic gamma ferric oxide contained herein is that prepared in EXAMPLE VIII.

Tape No. 7: The magnetic gamma ferric oxide contained herein is the same as that described for Tape No. 1 in Example VII, except that the oxide is mechanically densified to about 0.85 g/cc prior to incorporation in the tape to obtain better frequency response. The oxide is manufactured by Pfizer Inc., and is designated MO-2230.

Tape No. 8: The magnetic gamma ferric oxide contained herein is that prepared in Example IX.

Table 2 below gives a comparison of the magnetic performance of the three tapes described above. Tapes 6 and 7 were tested on an Ampex 440 tape recorder-reproduce machine and Tape 8 was tested on an Ampex 300 machine. The tape speed in all cases was 7½ inches/second.

Table 2

| Tape No. | 6 | 7 | 8 |
|---|---|---|---|
| Milling Time (hours) | 48 | 48 | 48.7 |
| Milling Viscosity (KU) | 82 | 86 | 92 |
| Coating Thickness (Micro Inches) | 411 | 395 | 389 |
| Peak Bias (mA) | 5.6 | 6.3 | 5.9 |
| Freq. Response | | | |
| at 100 Hz (dB) | 1.8 | −0.7 | 1.2 |
| at 1 kHz (dB) | 2.8 | 0.4 | 2.0 |
| at 7.5 kHz (dB) | 5.8 | 2.8 | 4.9 |
| at 10 kHz (dB) | 6.2 | 3.0 | 5.8 |

Table 2-continued

| Tape No. | 6 | 7 | 8 |
|---|---|---|---|
| at 15 kHz (dB) | 5.6 | 1.6 | 8.6 |
| Output at 3% THD (dB) | 11.3 | 8.2 | 11.0 |
| A. C. Noise (1–5 kHz) (dB) | −69.4 | −69.7 | −69.4 |
| D. C. Noise (1–5 kHz) (dB) | −65.0 | −63.6 | −61.3 |
| Saturated Output (dB) 500 Hz | 17.4 | 15.3 | 17.6 |
| Saturated Output (dB) 15 kHz | 0.9 | −1.2 | 1.0 |
| Dynamic Range (dB) | 72.2 | 70.1 | 71.4 |
| Signal/Noise (dB) | 80.7 | 77.9 | 80.4 |
| Print Thru (dB) | 46.0 | 48.0 | 48.5 |
| Tape Hc (1 kOe) | 286 | 302 | 311 |
| Tape Br (GAUSS) | 1475 | 1205 | 1411 |
| Tape Bm (GAUSS) | 1723 | 1566 | 1612 |
| Br/Bm at 1 kOe | 0.856 | 0.777 | 0.875 |
| Orientation Ratio at 1000 oe. | 2.90 | 1.65 | 3.13 |
| Resistance ($10^9$ OHMS) | 1.1 | >1000 | 0.5 |

Example XI

The switching field distribution of the particles in tapes 6 and 7 (described in Example X) are also measured by obtaining the hysteresis loop and differentiating it with respect to applied field. The measurements are made by standard procedures using a Hysteresis Loop Tracer. The peak obtained at the coercive force is characterized by measuring the width in Oe at 50% of the peak height. The half peak width for Tape No. 6 (the particle disclosed in the invention) is 79 Oe compared with 131 Oe for Tape No. 7. The narrow switching field distribution is produced by the particles being well oriented. Because Tape No. 6 has a switching field distribution which is about twice as narrow as Tape No. 7, there are less particles present which switch at low fields, producing a tape which is less easy to demagnetize than Tape 7. Hence, the self-demagnetization fields produced at high frequencies reduce the output less at 15,000 Hz for tape No. 6, than tape No. 7. Their respective saturated outputs at 15,000 Hz are 0.9 dB and −1.2 dB.

EXAMPLE XII

Thirty tapes containing magnetic gamma ferric oxides disclosed in the present invention are tested and give the following typical distribution of Br/Bm and orientation values in a 1000 oersted field.

| No. of Samples | Br/Bm |
|---|---|
| 7 | 0.88–0.89 |
| 12 | 0.87–0.88 |
| 4 | 0.86–0.87 |
| 4 | 0.85–0.86 |
| 3 | 0.84–0.85 |

| No. of Samples | Orientation Ratio |
|---|---|
| 2 | 3.2–3.4 |
| 12 | 3.0–3.2 |
| 9 | 2.8–3.0 |
| 4 | 2.6–2.8 |
| 3 | 2.4–2.6 |

EXAMPLE XIII

A. Preparation of Synthetic Lepidocrocite

In a 250 gallon tank equipped with a mechanical stirrer and a perforated pipe air sparger was added 128 gallons of 80° F. tap water and 16.2 gallons of aqueous solution containing 64.5 pounds ferrous chloride. Dilute the mix to 152 gallons. The solution was heated to 87° F. While vigorously stirring, over a 15 minute period, pump in 34 gallons of aqueous ammonia containing 4.02 gallons of ammonium hydroxide (assay 28.8% $NH_3$). Continue the stirring, turn on air, and completely oxidize to pH 3.45 in 1 hour, to form a synthetic lepidocrocite seed slurry. Complete lepidocrocite precipitation by heating above slurry to 99° F., pumping in additional ammonia solution (54 gallons containing 3.48 gallons ammonium hydroxide (assay 28.8% $NH_3$) at the rate of 0.116 gallons per minute. After 7 hours, 28 minutes precipitation was ended, 48.2 gallons ammonia solution was used, batch volume was 242 gallons and contained 40.8 pounds of hydrated gamma ferric oxide, lepidocrocite. Final pH value was 3.52.

Electron micrograph measurements are made on the lepidocrocite product obtained above, and the following particle size distribution results are found by assuming each particle is cylindrical in shape and calculating the distribution as a % of the total calculated volume of the particles.

| Particles having a length/width between: | % of total particles, on volume basis |
|---|---|
| 1.0–5.0 | 1.49 |
| 5.0–10.0 | 25.34 |
| 10.0–15.0 | 29.04 |
| 15.0–20.0 | 34.03 |
| 20.0–25.0 | 5.80 |
| 25.0–30.0 | 4.30 |
| | 100.00 |

EXAMPLE XIV

Preparation of Synthetic Lepidocrocite

In a 250 gallon tank equipped with a mechanical stirrer and a perforated pipe air sparger was added 165 gallons of 85° F. tap water and 16.3 gallons of aqueous solution containing 66.5 pounds ferrous chloride. Dilute the mix to 189.6 gallons. While vigorously stirring, over a 15 minute period, pump in 48 gallons of aqueous ammonia containing 3.9 gallons of ammonium hydroxide (assay 28.8% $NH_3$). Continue the stirring, turn on air, and completely oxidize to pH 3.3 in 52 minutes to form a synthetic lepidocrocite seed slurry. Complete lepidocrocite precipitation by maintaining above slurry at 100° F. by injecting 0.4–0.5 cfm $NH_3$ gas, while continuing aeration and stirring. After 7 hours, 20 minutes precipitation was ended, 9.5 lbs. $NH_3$ gas was used, batch volume was 242 gallons and contained 38.8 pounds of hydrated gamma ferric oxide, lepidocrocite. Final pH value was 3.52. This represents a lepidocrocite total product to seed ratio of about 2:1.

Preparation of Synthetic Magnetic Gamma Ferric Oxide

Surface treatment was done by heating the lepidocrocite product tank slurry to 175° F., then while stirring add a surface treating agent mix of 1.1 pounds of coconut oil fatty acid and 0.2 pounds of morpholine in 4 gallons of hot water. Continue heating to 190° F., filter, wash filter cake salt free. Product is practically pure lepidocrocite coated with about 2½% by weight of the fatty acid surface treating agent.

This material was reduced in either a batch type or continuous processing furnace at 750° F. in a hydrogen atmosphere to ferroso ferric oxide and subsequently oxidized in a current of air at 475° F. to gamma ferric oxide whose magnetic properties were improved by mechanically densifying, 45 minutes, in a muller-mixer machine. The resulting finished oxide tested magnetically in a 1000 oersted field as a dry powder showed Hc of 350, Br of 2080, Bm of 3690.

Electron micrograph measurements are made on the gamma ferric oxide product obtained above, and the following particle size distribution results are found by assuming each particle is cylindrical in shape and calculating the distribution as a % of the total calculated volume of the particles.

| Particles having a length/width between: | % of total particles, on volume basis |
|---|---|
| 1.0–4.0 | 16.63 |
| 4.0–7.0 | 47.00 |
| 7.0–10.0 | 24.37 |
| 10.0–13.0 | 9.05 |
| 13.0–16.0 | 1.83 |
| 16.0–18.6 | 1.12 |
| | 100.00 |

What is claimed is:

1. Synthetic magnetic gamma ferric oxide in the form of very fine-grained, needle-like crystalline particles having a length to width ratio of up to about 20:1 and a length up to about 2 microns, said ferric oxide providing an orientation ratio of at least 2.4 in a 1000 oersted field and a half peak width of the switching field distribution of up to about 79 oersteds when incorporated with a binding medium to form a magnetic impulse record member.

* * * * *